United States Patent [19]

Justice et al.

[11] E Re. 30,864

[45] Reissued Feb. 9, 1982

[54] PROCESS FOR ELECTROLYSIS IN A MEMBRANE CELL EMPLOYING PRESSURE ACTUATED UNIFORM SPACING

[75] Inventors: David D. Justice, Cleveland, Tenn.; Byung K. Ahn, Pittsburgh, Pa.; Ronald L. Dotson, Cleveland, Tenn.

[73] Assignee: Olin Corporation, New Haven, Conn.

[21] Appl. No.: 64,651

[22] Filed: Aug. 7, 1979

Related U.S. Patent Documents

Reissue of:

[64] Patent No.: 4,105,514
Issued: Aug. 8, 1978
Appl. No.: 810,135
Filed: Jun. 27, 1977

[51] Int. Cl.[3] ..... C25B 1/34; C25B 13/00

[52] U.S. Cl. ..... 204/98; 204/128; 204/263; 204/266

[58] Field of Search ..... 204/98, 128, 263, 266

[56] References Cited

U.S. PATENT DOCUMENTS

| | | | |
|---|---|---|---|
| B 361,744 | 1/1975 | Gritzner | 204/266 |
| 3,017,338 | 1/1962 | Butler, Jr. et al. | 204/129 |
| 3,220,941 | 11/1965 | Osborne | 204/263 |
| 3,242,059 | 3/1966 | Cottam et al. | 204/98 |
| 3,598,715 | 8/1971 | Goens et al. | 204/278 |
| 3,649,511 | 3/1972 | Danly et al. | 204/252 |
| 3,657,099 | 4/1972 | Seko et al. | 204/253 |
| 3,684,670 | 8/1972 | Raetzsch | 204/95 |
| 4,014,775 | 3/1977 | Kircher et al. | 204/252 |
| 4,025,405 | 5/1977 | Dotson et al. | 204/98 |
| 4,108,742 | 8/1978 | Seko et al. | 204/98 |
| 4,142,950 | 3/1979 | Creamer et al. | 204/258 |

FOREIGN PATENT DOCUMENTS

| | | | |
|---|---|---|---|
| 2503652 | 8/1975 | Fed. Rep. of Germany . | |
| 2510396 | 9/1975 | Fed. Rep. of Germany | 204/98 |
| 2538414 | 3/1977 | Fed. Rep. of Germany . | |
| 542358 | 1/1942 | United Kingdom . | |
| 1336225 | 11/1973 | United Kingdom | 204/252 |
| 1480538 | 7/1977 | United Kingdom | 204/98 |

*Primary Examiner*—R. L. Andrews
*Attorney, Agent, or Firm*—James B. Haglind; Donald F. Clements

[57] ABSTRACT

An electrolytic cell employing a hydraulically impermeable membrane having a spacing means interposed between the anode and the membrane, is operated by providing a positive pressure differential between the cathode compartment and the anode compartment. The pressure differential is sufficient to maintain contact between the spacer and the membrane to provide uniform spacing between the anode and the membrane. In addition, this process provides sufficient spacing between the membrane and the cathode to provide efficient release of any gas formed and to prevent gas blinding at the cathode. Employing the positive pressure differential enables the cell to be operated at reduced energy costs when producing, for example, concentrated solutions of sodium hydroxide by careful control of the spacing between the membrane and the electrodes.

27 Claims, 7 Drawing Figures

PROCESS FOR ELECTROLYSIS IN A MEMBRANE CELL EMPLOYING PRESSURE ACTUATED UNIFORM SPACING

Matter enclosed in heavy brackets [ ] appears in the original patent but forms no part of this reissue specification; matter printed in italics indicates the additions made by reissue.

In the production of alkali metal hydroxides in membrane-type electrolytic cells, materials having ion-exchange properties are now available for use as membranes which are capable of producing solutions having a high concentration of alkali metal hydroxides. Production of these concentrated solutions in commercial electrolytic cells currently available, however, [requires] *has initially been found to require* high cell voltages and [results in] increased power costs in operating the cells.

It has been customary to place the membrane on the cathode so that there is little or no space between the membrane and the cathode. *For example, see British Patent No. 1,480,538 published Jul. 20, 1977, (after the filing date of the parent to this present reissue) to Diamond Shamrock Corporation, a leading licensor of electrode technology in the chloralkali industry. British Patent No. 1,480,538, corresponds to U.S. patent application Ser. No. 439,058, filed Feb. 4, 1974, by Stacey et al. (never issued) and teaches that the lowest voltage is with no space between the anode or cathode and the membrane, that a differential pressure from the cathodic side or, alternatively, spacers on the electrodes faces or physically affixing the membrane on or very near the anode contributes to decreased voltages.* This arrangement impedes the release of hydrogen bubbles which are formed at the cathode and are retained in the cathode-membrane gap. The presence of *unreleased* hydrogen bubbles *in the space between anode and cathode* raises the cell voltage.

It is therefore advantageous to provide a space between the cathode and the ion-exchange membrane that is sufficient to permit the release of hydrogen gas bubbles. This can be done by providing a positive pressure from the cathode compartment to the anode compartment.

German Offenlegensschriftung 2,510,396 published Sept. 11, 1975, by M. Seko et al *of Asahi Chemical Company, a leading licensor of membrane cell technology,* teaches a bipolar cell in which the liquid in the cathode chamber is higher by 0.2 to 5 m. than the liquid in the anode compartment to provide a pressure differential. The bipolar cell *utilizes both louvered, gas-directing anodes and gas-directing, louvered cathodes to create turbulence in the area between the anode or cathode and the membrane. The cell* is operated to [release] *direct* the gas bubbles generated in the *space between the anode or cathode and the membrane through that anode or cahtode, which must therefore be gas permeable electrodes, and into the portion of the* anode and cathode compartments behind *the* gas permeable electrodes [and provides] *to enhance such flow, there is* a greater distance behind the electrodes than there is between the electrodes and the cation exchange membrane. *This patent teaches that directing bubbles into the space between the electrode and the membrane causes higher cell voltage (and thus higher power consumption per unit amount of product) but that turbulence near the membrane caused by directed gas flow is desirable.* Operation of the cell relies on the turbulence produced by the release of gas bubbles which serve to prevent contact between the anode and the membrane. The electrodes are in a fixed position with a narrow gap between each of the electrodes and the membrane.

The cell of German Offenlegungsschriftung 2,510,396, however, does not provide uniform spacing between the electrodes and the membrane. In addition, high pressures and high current densities are employed requiring cell components which are resistant to the pressures and temperatures generated resulting in increased capital costs. Further, the cells require excessive heights to provide the levels of catholyte liquor required to produce the high pressures needed. *Reference is also made to U.S. Pat. No. 3,598,715 to Goens, et al. issued Aug. 10, 1971, which shows louvered cathodes used in a chlorate cell, the louvers being oriented at between about 20° and about 70°, preferably between about 35° and 55° to the plane (vertical) of the original sheet and the openings being of diamond, oval or other shapes.*

Therefore, it is an object of the present invention to provide a process for electrolysis which easily maintains a uniform spacing between the electrodes and the hydraulically impermeable membrane to reduce cell voltage.

Another object of the present invention is to provide a process for electrolysis which employs low differential pressures between the cathode compartment and the anode compartment.

An additional object of the present invention is to provide a process for electrolysis having reduced energy costs by decreasing cell voltage while producing concentrated catholyte liquors.

A further object of the present invention is to provide a process which prevents gas blinding at the electrodes.

These and other objects of the present invention are accomplished in a process for electrolysis in an electrolytic cell comprising an anode compartment containing a foraminous anode and an anolyte solution, a cathode compartment containing a low hydrogen overvoltage metal cathode and a catholyte solution, a hydraulically impermeable membrane separating the anode compartment from the cathode compartment, a spacing means interposed between the anode and the hydraulically impermeable membrane to space the anode apart from the hydraulically impermeable membrane wherein the process comprises providing a positive pressure differential from the cathode compartment to the anode compartment to maintain contact between the hydraulically impermeable membrane and the spacing means to provide uniform spacing between the anode and the hydraulically impermeable membrane, said positive pressure differential being sufficient to maintain said membrane against said spacing means.

Figure 1:
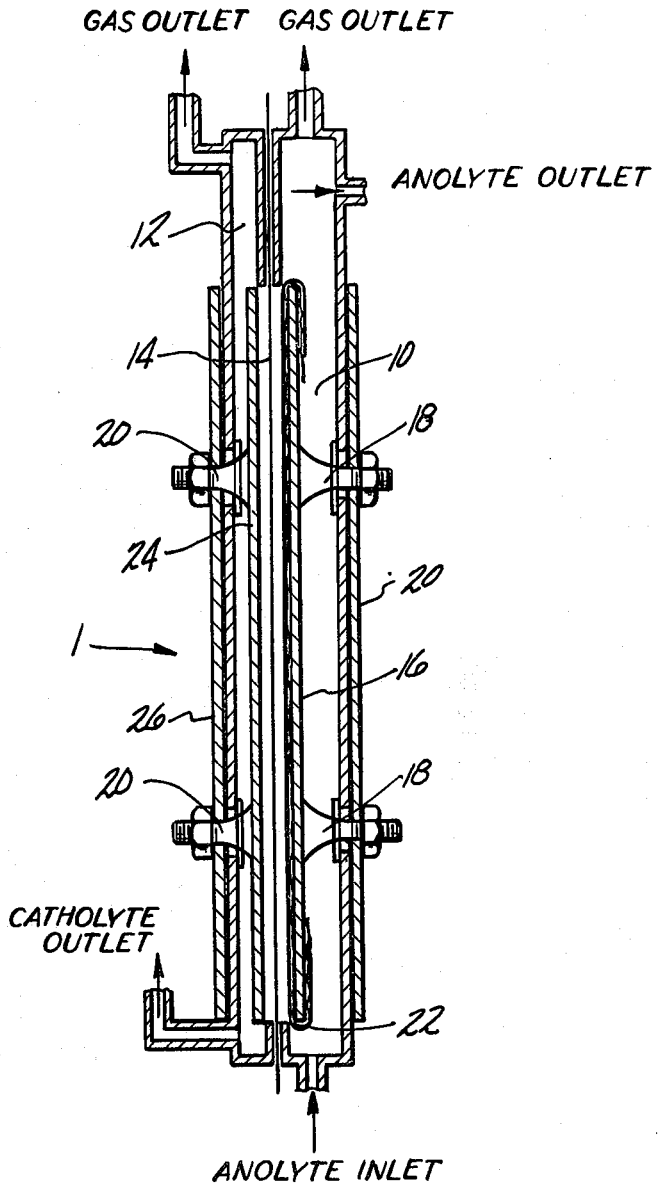
FIG. 1 illustrates schematically an electrolytic cell suitable for use with the process of the present invention.

FIG. 1 illustrates schematically a monopolar electrolytic cell 1 having an anode compartment 10 and a cathode compartment 12 separated by a cation permeable separator 14. Adjustable anode 16 is a foraminous metal screen having threaded flanges 18 which enable anode 16 to be adjustably secured to anode plate 20. Spacer 22 separates anode 16 from cation permeable separator 14. Adjustable cathode 24 in cathode compartment 12 is a foraminous metal screen having threaded flanges 20 which adjustably secure cathode 24 to cathode plate 26. Cell 1 has inlets and outlets as shown for the feeding and removal of the anolyte and the removal of the catholyte and the products of electrolysis.

*Although it would be advantageous, as stated in German Offenlegungsschriffung 2,510,396, above noted, to utilize the louvered cathode concept in a series multi-cell, bipolar configuration which has a plurality of anodes, cathodes, anolyte and catholyte compartments separated by a plurality of cation-permselective membranes with the anodes and cathodes connected in series, the present invention will be described in terms of the monopolar cell of FIG. 1.*

In operating a monopolar cell of the type of FIG. 1, a positive pressure is applied to the hydraulically impermeable membrane from the cathode compartment to maintain contact between the membrane and the spacer which contacts one side of the anode. The pressure should be sufficient to maintain contact between the membrane and the spacer and the spacer and the anode so that a uniform electrolyte gap is provided between the anode and the membrane. Suitable differential pressures are defined such that the hydrostatic pressure of the catholyte plus the gas pressure over the catholyte minus the hydrostatic pressure of the anolyte minus the gas pressure over the anolyte is from about 0.01 to about 25 inches when the solution in the cathode chamber corresponds to a gas-free solution having specific gravities from about 1.05 to 1.55 and the solution in the anode chamber corresponds to a gas-free solution having specific gravities of 1.08 to 1.20. Preferred differential pressures are those from about 2 to about 20, more preferred are those from about 4 to about 15, and most preferred are those of from about 4 to about 12 inches.

Anodes used in the process of the present invention include foraminous metal structures at least a portion of which is coated with an electroconductive electrocatalytically active material. Suitable metals of which the anodes are composed include a valve metal such as titanium or tantalum or metals such as steel, copper, or aluminum clad with a valve metal. Over at least a part of the surface of the valve metal is a thin coating of an electrocatalytically active material such as a platinum group metal, platinum group metal oxide, an alloy of a platinum group metal, or a mixture thereof. The term "platinum group" as used in this specification means an element of the group consisting of ruthenium, rhodium, palladium, osmium, iridium and platinum.

The foraminous metal structure can be in various forms, such as a perforated plate or sheet, mesh or screen, or as an expanded metal. The anodes have a planar surface which contains openings, suitably sized to permit the flow of fluids through the anode surface. The foraminous metal structure has a thickness of from about 0.03 to about 0.10, and preferably from about 0.05 to about 0.08 of an inch.

In a suitable example, the anode is comprised of two foraminous screens which are spaced apart to provide for passage of halogen gas and anolyte and to enclose conductive supports which supply electrical current. The screens are closed along the top, bottom and front edges to form a self-contained compartment.

The foraminous metal anode structures are attached to an anode plate by means of conductive supports such as rods which supply electrical energy to the electrochemically active surfaces. The anode plate is wholly or partially constructed of electroconductive materials such as steel, copper, aluminum, titanium, or a combination of these materials. Where the electroconductive material can be attacked by the alkali metal chloride brine or chlorine gas, it is suitably covered with a chemically inert material.

The electrocatalytically coated portions of the foraminous metal anode structure are prevented from adhering to the membrane by a spacing means. Direct contact between the membrane and electrocatalytically coated portions results in the loss of current efficiency and when using a platinum group coating, can result in an increased rate in the loss or removal of the platinum group component from the electrode surface.

In one embodiment, the spacing means is, for example, a screen or net suitably composed of any non-conducting chlorine-resistant material. Typical examples include glass fiber, asbestos filaments, plastic materials, for example, polyfluoroolefins, polyvinyl chloride, polypropylene and polyvinylidene chloride, as well as materials such as glass fiber coated with a polyfluoroolefin, suc as polytetrafluoroethylene.

Any suitable thickness for the spacing means may be used to provide the desired degree of separation of the anode surface from the membrane. For example, spacing means having a thickness of from about 0.003 to about 0.125 of an inch may be suitably used with a thickness of from about 0.010 to about 0.080 of an inch being preferred. Any mesh size which provides a suitable opening for brine flow between the anode and the membrane may be used. Typical mesh sizes for the spacing means which may be employed include from about 0.5 to about 20 and preferably from about 4 to about 12 strands per lineal inch. The spacing means may be produced from woven or non-woven fabric and can suitably be produced, for example, from slit sheeting or by extrusion.

While it is not required, if desired, the spacing means may be attached to the anode surfaces, for example, by means of clamps, cords, wires, adhesives, and the like.

As the novel process of the present invention applies sufficient pressure from the cathode to the membrane to maintain contact between it and the spacing means and preferably the spacing means and the anode, the anode to membrane gap is preferably the thickness of the spacing means. This gap is from about 0.003 to about 0.125, and preferably from about 0.010 to about 0.080 of an inch.

The space between the cathodes and the membrane is equal or greater than the space between the anode surfaces and the membrane. In addition, this cathode-membrane gap is free of obstructing materials such as spacers, etc. to provide maximum release of hydrogen gas in the area between the membrane and the cathode. The cathodes are spaced apart from the membranes a distance of from about 0.020 to about 0.600, and preferably from about 0.030 to about 0.400.

The cathodes used are those having a low hydrogen overvoltage, for example, structures of metals including steel, nickel or copper or these and other metals such as titanium which are suitably coated with a material which provides a low hydrogen overvoltage. The structures are preferably fabricated to facilitate the release of hydrogen gas from the catholyte liquor. It is preferable that the cathodes have an open area of at least about 10 percent, preferably an open area of from about 30 to about 70 percent, and more preferably an open area of from about 45 to about 65 percent.

Figure 3:
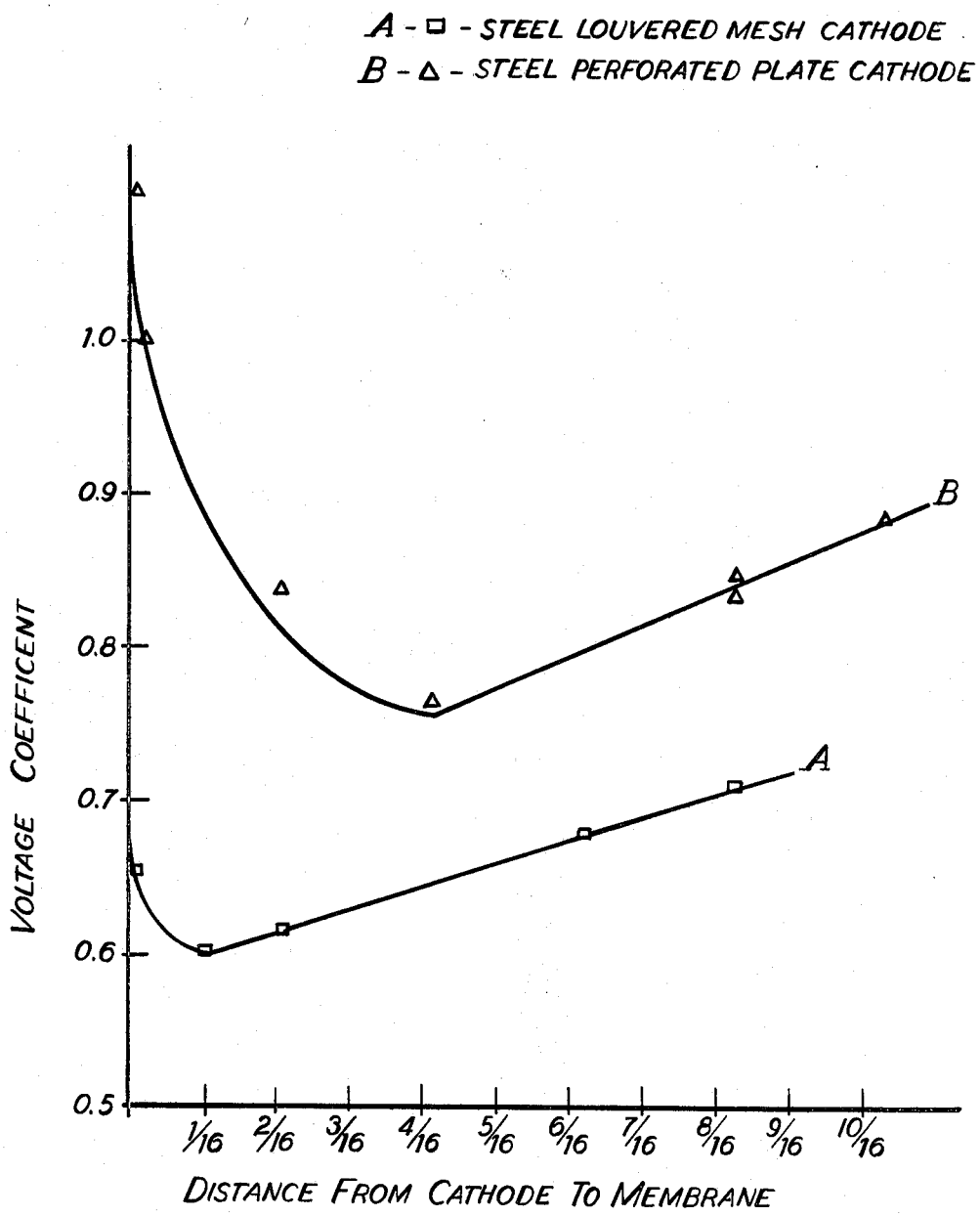
FIG. 3 depicts a graph showing the relationship between the voltage coefficient and the cathode to membrane spacing for two different cathodes.
Figure 6:
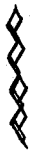
FIG. 6 represents a side *elevational* view of the cathode of FIG. 4 *showing the louvered, gas-directing structure thereof.*
Figure 7:
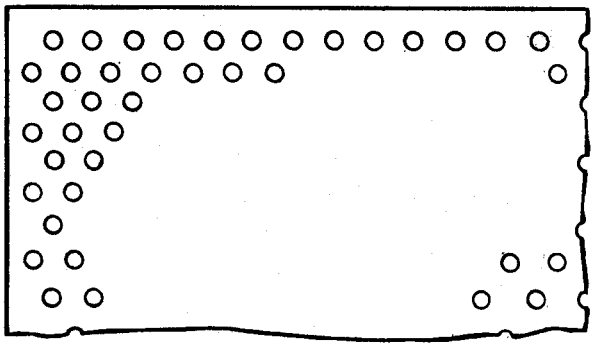
FIG. 7 is an [end] *front or back elevational* view of a portion of a *flat* perforated plate cathode suitable for use in the process of the present invention.

The foraminous metal structures suitable for use as cathodes include forms such as a *flat (non-gas directing) or louvered ("unflattened" or "gas-directing")* perforated plate or sheet, *flat or louvered* mesh or screen or as an *flat or louvered* expanded metal. *An example of a flat electrode is the flat, perforated plate in FIG. 7. An example of a louvered or gas-directing electrode is that shown in FIGS. 4, 5, and 6.* When a perforated plate or sheet is employed as the cathode, the gap between the cathode and the membrane is, for example, from about 0.100 to about 0.400 of an inch, preferably from about 0.125 to about 0.375 of an inch. *As seen in Example 3 and FIG. 3, the optimum gap for flat perforated steel plate was found to be about ¼ inch.* Cathodes in the form of a *flat or louvered* mesh, *flat or louvered* screen or *flat or louvered* expanded metal are suitably spaced apart from the membrane a distance of from about 0.020 to about 0.200, and preferably from about 0.030 to about 0.130 of an inch. *As seen in Example 2 and FIG. 3, the optimum gap for a louvered mesh cathode was found to be about 1/16 inch. That is, the louvered electrode could operate optimally at 75% less gap than the flat perforated steel electrode.* The cathode membrane gap is sufficiently large enough to prevent gas blinding of the cathode and to permit release of hydrogen gas between the membrane and the cathode.

Cathodes may be constructed of any suitable metals including steel, copper or nickel and alloys thereof. Other metals such as those of the titanium group may be employed if they are suitably coated with materials which provide a low hydrogen overvoltage.

Suitable membranes used in the process of the present invention are those composed of an inert, flexible material having cation exchange properties and which are impervious to the hydrodynamic flow of the electrolyte and the passage of anode-generated gases and anions. Examples are perfluorosulfonic acid resin membranes, perfluorocarboxylic acid resin membranes, composite membranes or chemically modified perfluorosulfonic acid or perfluorocarboxylic acid resins. Chemically modified resins include those substituted by groups including sulfonic acid, carboxylic acid, phosphoric acid, amides or sulfonamides. Composite membranes include those employing more than one layer of either the perfluorosulfonic or perfluorocarboxylic acid where there is a difference of equivalent weight or ion exchange capacity between at least two of the layers; or where the membrane is constructed of both the perfluorosulfonic acid and the perfluorocarboxylic acid resins.

One preferred membrane material is a perfluorosulfonic acid resin membrane composed of a copolymer of a polyfluoroolefin with a sulfonated perfluorovinyl ether. The equivalent weight of the perfluorosulfonic acid resin is from about 900 to about 1600, and preferably from about 1100 to about 1500. The perfluorosulfonic acid resin may be supported by a polyfluoroolefin fabric. Perfluorosulfonic acid resin membranes sold commercially by E. I. DuPont de Nemours and Company under the trademark "Nafion" are suitable examples of the preferred membrane.

Another preferred embodiment is a perfluorocarboxylic acid resin membrane having an ion exchange capacity of up to 1.3 milliequivalents per gram, as produced by Asahi Glass Company.

In a preferred embodiment, the process of the present invention is employed in an electrolytic cell in which the foraminous metal anode structure and the spacing means are enclosed or surrounded by the hydraulically impermeable membrane. This embodiment facilitates maintaining a uniform spacing between the membrane and the anode surface. In addition, it simplifies maintaining the desired differential pressure between the cathode compartment of the cell and the self-contained anode compartments.

To enclose the anode, the membrane is obtained in tube or sheet form and sealed, for example, by heat sealing, along the appropriate edges to form an enclosed compartment.

This permits the entire area of the cell body which is not occupied by the anode compartments to serve as the cathode compartment. A voluminous section is thus provided for gas release from the catholyte liquor.

The process of the present invention is suitably used in electrolytic cells for the production of chlorine and alkali metal hydroxide solutions by the electrolysis of alkali metal chlorides. For example, an aqueous sodium chloride solution containing from about 120 to about 320 grams per liter of NaCl and at a pH of from about 2 to about 12 is fed to the anode compartments, where, as an anolyte solution, the pH is maintained at from about 2 to about 6. Electric current is supplied to provide current densities of from about 0.5 to about 5 kiloamperes per square meter. Sodium hydroxide solutions containing at least 200 grams per liter, preferably at least 275 grams per liter, and more preferably at from about 300 to about 800 grams per liter by weight of NaOH are produced in the cathode compartment.

It is surprising that, in producing strong alkali metal hydroxide solutions containing at least 300 grams per liter by weight of the alkali metal hydroxide, an increase in the cathode-membrane gap results in a decrease in cell voltage employing the process of the present invention.

The low to moderate differential pressures between the cathode compartment and the anode compartment maintain uniform gaps between the membrane and the electrodes and avoid gas blinding at the electrodes.

To further illustrate the novel process of the present invention, the following examples are presented. All parts and percentages are given by weight unless otherwise specified.

EXAMPLE 1

Figure 2:
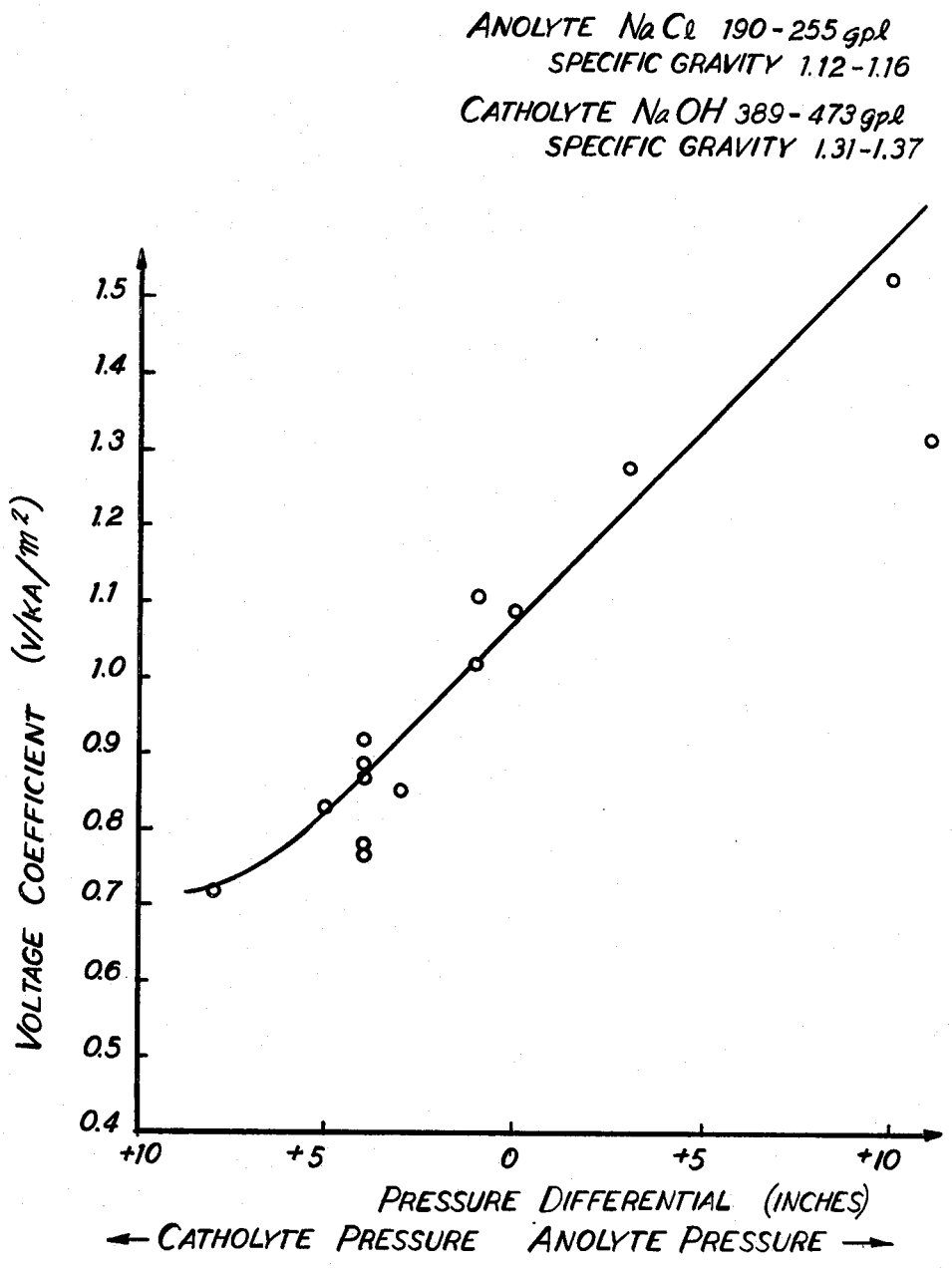
FIG. 2 represents a graph showing the relation of the voltage coefficient to pressure differentials for anolyte pressures and catholyte pressures.

A cell of the type of FIG. 1 was employed where the anode compartment contained a titanium screen coated to one side with an electrochemically active coating of ruthenium dioxide as the anode. The anode was spaced apart from a cation exchange membrane by a plastic net which provided a uniform spacing between the anode and the membrane of one-sixteenth of an inch. A perfluorosulfonic acid resin membrane separated the anode compartment from the cathode compartment which contained a steel perforated plate cathode one-sixteenth of an inch thick, spaced apart from the membrane a distance of one-sixteenth of an inch. The membrane was a homogeneous film 7 mils thick of 1200 equivalent weight perfluorosulfonic acid resin laminated with a T-12 fabric of polytetrafluoroethylene. Sodium chloride brine was supplied to the anode compartment at a concentration of 190 to 255 grams per liter of NaCl, a temperature of 80° C. and a pH of about 4.6. The cell was operated until the catholyte liquor became concentrated and it was maintained in the range of from 389 to 473 grams per liter of NaOH. A vacuum was applied to the gas outlet of the anode compartment. The vacuum and the anolyte level were varied to permit the differential pressure from the anode compartment to the cathode compartment to be varied. As the differential pressure was varied, the cell voltages were recorded and the corresponding voltage coefficients calculated. The catholyte level was allowed to rise above that of the anolyte level to provide a positive differential pressure from the cathode compartment to the anode compartment. As the pressure varied, the cell voltages were again recorded and the voltage coefficients calculated. The results, as shown on the graph of FIG. 2, show that a positive differential pressure from the cathode compartment to the anode compartment results in lower voltage coefficients and thus highly improved cell operation. In contrast, increasing the positive differential pressure from the anode compartment to the cathode compartment results in increasing voltage coefficients.

EXAMPLE 2

Figure 5:
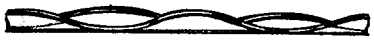
FIG. 5 illustrates [an] *a bottom or top* end view of the cathode of FIG. 4 *showing the louvered gas-directing structure thereof.*
Figure 4:
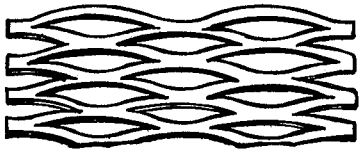
FIG. 4 shows a [plan] *front or back elevational* view of a portion of a louvered mesh cathode suitable for use in the process of the present invention.

A cell of the type of FIG. 1 was employed where the anode compartment contained a titanium screen coated on one side with an electrochemically active coating of ruthenium dioxide as the anode. The anode was spaced apart from a cation exchange membrane by a plastic net which provided a uniform spacing between the anode and the membrane of one-sixteenth of an inch. *(0.16 cm)* A perfluorosulfonic acid resin membrane separated the anode compartment from the cathode compartment [which] contained a steel louvered mesh cathode of the type illustrated by FIGS. 4–6. The mesh had a thickness of one-sixteenth of an inch where the length of the mesh was 1.3 inches *(3.35 cm)* and the width 0.3 of an inch, *(10.774 cm)* when measured from center to center of adjacent bridges. *The louvered cathode shown in FIGS. 4, 5, and 6 is thus about 2.6 inches wide (2×1.3") and about 1.2 inches (4×0.3" tall), or 3.1 square inches (20.1 cm²).* The membrane was a homogeneous film 7 mils *(18 mm)* thick of 1200 equivalent weight perfluorosulfonic acid resin laminated with a T-12 fabric of polytetrafluoroethylene. Sodium chloride brine was supplied to the anode compartment at a concentration of 20–22 percent by weight of NaCl, a temperature of 80° C. and a pH of about 4.5. The catholyte in the cathode compartment was maintained at a level above the anolyte to continuously provide a differential pressure of 4 inches from the cathode compartment to the anode compartment. At this pressure, the membrane contacted the spacer and the spacer contacted the electrochemically active surface of the anode. Electrolysis was conducted at a current density of 1.6 to 1.8 KA/m² for a period of about 3 weeks. Sodium hydroxide liquor at a concentration of 370–410 grams per liter was produced in the cathode compartment. During operation of the cell, the distance between the cathode and the membrane was varied from ½ inch to where the membrane contacted the cathode. At each spacing, the cell voltage and current density were recorded and the voltage coefficient calculated. As illustrated by Curve A of FIG. 3, as the cathode to membrane gap was decreased from ½ inch to 1/16th inch, *for the louvered gas directing cathode* the voltage coefficient decreased. However, as the cathode was [removed] *moved* moved even closer to the membrane, at distances less than 1/16th inch, the voltage coefficients increased significantly, indicating that hydrogen gas blinding occurred.

EXAMPLE 3

Using the procedure of Example 2, a perforated steel plate cathode was substituted for the steel louvered mesh cathode. All other cell components were identical including the differential pressure and the NaOH concentration range. The cathode was a steel perforated plate (No. 11 gauge) of the type illustrated by FIG. 7, having perforations one-eighth of an inch in diameter on ¼ inch staggered centers. Over a period of three weeks, the space between the perforated plate cathode and the membrane was varied from a distance of five-eighths of an inch to where the cathode contacted the membrane. As illustrated in Curve B of FIG. 3, as the distance between the cathode and the membrane decreased in the range of five-eighths of an inch to one-fourth of an inch, the voltage coefficient also decreased. However, when the space between membrane and the cathode become less than one-fourth of an inch, the voltage coefficients increased as the space was reduced.

Examples 2 and 3 show that in concentrated NaOH solutions, when the differential pressure from the cathode compartment to the anode compartment is sufficient to press the membrane against the spacer, the cathode to membrane gap is dependent on the cathode structure.

EXAMPLE 4

A cell of the type of FIG. 1 was employed where the anode compartment contained a titanium screen coated on one side with an electrochemically active coating of ruthenium dioxide as the anode. The anode was spaced apart from a cation exchange membrane by a plastic net which provided a uniform spacing between the anode and the membrane of one-sixteenth of an inch. A perfluorosulfonic acid resin membrane separated the anode compartment from the cathode compartment which contained a steel screen cathode spaced apart for the membrane a distance of one-sixteenth of an inch. The membrane was a homogeneous film 7 mils thick of 1200 equivalent weight perfluorosulfonic acid resin laminated with a T-12 fabric of polytetrafluoroethylene. Sodium chloride brine was supplied to the anode compartment at a concentration of 20–22 percent by weight of NaCl, a temperature of 80° C. and a pH of about 4.5. The catholyte in the cathode compartment was maintained at a level above the anolyte to provide a differential pressure of 4 inches from the cathode compartment to the anode compartment. Electrolysis was conducted at a current density of 1.6 to 1.8 KA/m² for a period of about 3 weeks with a cell voltage coefficient of 0.55. Sodium hydroxide liquor at a concentration of 370–410 grams per liter was produced at a cathode current efficiency of 70 percent. During operation of the cell, hydrogen was produced in the cathode compartment in the space between the membrane and the cathode. No evidence of gas blinding at either the anode or cathode was found.

What is claimed is:

1. A process for electrolysis in an electrolytic cell comprising an anode compartment containing a foraminous anode and an anolyte solution, a cathode compartment containing a foraminous metal cathode and a catholyte solution, a hydraulically impermeable membrane separating said anode compartment from said cathode compartment, spacing means interposed between said anode and said hydraulically impermeable membrane to space apart said anode from said hydraulically impermeable membrane, wherein the process comprises providing a positive pressure differential between said cathode compartment and said anode compartment to maintain contact between said hydraulically impermeable membrane and said spacing means to provide uniform spacing between said anode and said hydraulically impermeable membrane, said positive differential pressure being sufficient to maintain said membrane against said spacing means.

2. The process of claim 1 in which said cathode is spaced apart from said hydraulically impermeable membrane a distance of from about 0.020 to about 0.600 of an inch to form a gas release zone.

3. The process of claim 2 in which said hydraulically impermeable membrane is composed of a resin selected from the group consisting of perfluorosulfonic acid, perfluorocarboxylic acid, chemically modified perfluorosulfonic acid, chemically modified perfluorocarboxylic acid and composites thereof.

4. The process of claim 3 in which said spacing means is a screen or net comprised of a material selected from the group consisting of glass fibers, asbestos filaments, plastic materials selected from the group consisting of perfluoroolefins, polyvinyl chloride, polypropylene, polyvinylidene chloride, and glass fibers coated with said plastic materials.

5. The process of claim 4 in which said spacing means has a thickness of from about 0.010 to about 0.080 of an inch.

6. The process of claim 5 in which said positive differential pressure is from about 0.01 to about 25 inches.

7. The process of claim 6 in which said anolyte solution is an aqueous solution of an alkali metal chloride and said catholyte is an aqueous solution of an alkali metal hydroxide.

8. The process of claim 7 in which said anolyte alkali metal chloride is sodium chloride having a pH of from about 2 to about 6 and said alkali metal hydroxide is sodium hydroxide having a concentration of at least 200 grams per liter of NaOH.

9. The process of claim 8 in which said cathode is a metal in a form selected from the group consisting of a mesh, screen or expanded metal and spaced apart from said hydraulically impermeable membrane a distance of from about 0.020 to about 0.200 of an inch.

10. The process of claim 9 in which said positive differential pressure is from about 2 to about 20 inches.

11. The process of claim 10 in which said sodium hydroxide has a concentration of at least 275 grams per liter of NaOH.

12. The process of claim [11] 2 in which said anode *includes two foraminous screens spaced apart to provide for passage of anolyte and gaseous products therebetween and said anode* and said spacer are enclosed in said hydraulically impermeable membrane.

13. The process of claim 12 in which said hydraulically impermeable membrane is [composed] *comprised* of a resin selected from the group consisting of perfluorosulfonic acid, chemically modified perfluorosulfonic acid and composites thereof.

14. The process of claim 13 in which said positive differential pressure is from about 4 to about 15 inches.

15. The process of claim 14 in which said sodium hydroxide has a concentration of from about 300 to about 800 grams per liter of NaOH.

16. The process of claim 8 in which said cathode is a perforated metal plate or sheet and is spaced apart from said hydraulically impermeable membrane a distance of from about 0.100 to about 0.400 of an inch.

17. The process of claim 16 in which said positive differential pressure is from about 2 to about 20 inches.

18. The process of claim 17 in which said anode and said spacing means are enclosed in said hydraulically impermeable membrane.

19. The process of claim 18 in which said sodium hydroxide concentration is from about 300 to about 800 grams per liter of NaOH.

20. The process of claim 4 in which said anode and said spacing means are enclosed in said hydraulically impermeable membrane.

21. The process of claim 20 in which said positive differential pressure is from about 4 to about 15 inches and said spacer has a thickness of from about 0.010 to about 0.080 of an inch.

22. The process of claim 21 in which said anolyte is an alkali metal chloride and said catholyte is an alkali metal hydroxide.

23. The process of claim 22 in which said cathode is spaced apart from said hydraulically impermeable membrane a distance of from about 0.030 to about 0.400 of an inch.

24. The process of claim 23 in which said anolyte is sodium chloride and said catholyte is sodium hydroxide.

25. The process of claim 24 in which said positive differential pressure is from about 4 to about 15 inches and said sodium hydroxide has a concentration of from about 300 to about 800 grams per liter of NaOH.

26. The process of claim 25 in which said electrolytic cell is monopolar.

27. A process for the electrolysis of alkali metal chloride brines in an electrolytic cell comprising an anode compartment containing a foraminous anode and an anolyte solution, a cathode compartment containing a foraminous metal cathode and a catholyte solution, a hydraulically impermeable membrane separating said anode compartment from said cathode compartment, spacing means interposed between said anode and said hydraulically impermeable membrane to space apart said anode from said hydraulically impermeable membrane, wherein the process comprises providing a positive pressure differential between said cathode compartment and said anode compartment to maintain contact between said hydraulically impermeable membrane and said spacing means to provide uniform spacing between said anode and said hydraulically impermeable membrane, said positive differential pressure being sufficient to maintain said membrane against said spacing means.

* * * * *